United States Patent
Dallier et al.

(10) Patent No.: US 11,648,942 B2
(45) Date of Patent: May 16, 2023

(54) ASSISTANCE DEVICE FOR DRIVING A MOTOR VEHICLE IN A TRAFFIC LANE

(71) Applicants: RENAULT s.a.s., Boulogne Billancourt (FR); NISSAN MOTOR Co. Ltd, Yokohama (JP)

(72) Inventors: Emmanuel Dallier, Freneuse (FR); Alain Haddad, Maurepas (FR)

(73) Assignees: RENAULT s.a.s., Boulogne Billancourt (FR); NISSAN MOTOR Co. Ltd, Yokohama (JP)

( * ) Notice: Subject to any disclaimer, the term of this patent is extended or adjusted under 35 U.S.C. 154(b) by 36 days.

(21) Appl. No.: 16/619,360

(22) PCT Filed: Jun. 6, 2018

(86) PCT No.: PCT/FR2018/051311
§ 371 (c)(1),
(2) Date: Dec. 4, 2019

(87) PCT Pub. No.: WO2018/224778
PCT Pub. Date: Dec. 13, 2018

(65) Prior Publication Data
US 2020/0156635 A1    May 21, 2020

(30) Foreign Application Priority Data
Jun. 6, 2017 (FR) ...................... 1754982

(51) Int. Cl.
*B60W 30/12* (2020.01)
*B62D 15/02* (2006.01)
*G08G 1/16* (2006.01)

(52) U.S. Cl.
CPC ......... *B60W 30/12* (2013.01); *B62D 15/025* (2013.01); *G08G 1/167* (2013.01);
(Continued)

(58) Field of Classification Search
CPC ................................. B60W 2710/20
See application file for complete search history.

(56) References Cited

U.S. PATENT DOCUMENTS

| 2008/0183342 | A1 | 7/2008 | Kaufmann et al. |
| 2011/0015850 | A1* | 1/2011 | Tange .............. B62D 15/025 701/116 |

(Continued)

FOREIGN PATENT DOCUMENTS

| EP | 1 950 115 A2 | 7/2008 |
| EP | 2 902 301 A1 | 8/2015 |

(Continued)

OTHER PUBLICATIONS

International Search Report dated Sep. 28, 2018 in PCT/FR2018/051311 filed on Jun. 6, 2018, 3 pages.

*Primary Examiner* — Jason Holloway
*Assistant Examiner* — Jerrod Irvin Davis
(74) *Attorney, Agent, or Firm* — Oblon, McClelland, Maier & Neustadt, L.L.P.

(57) ABSTRACT

An assistance device for driving in a traffic lane for a motor vehicle includes a module for determining at least one input variable chosen from among variables related to the vehicle and variables related to the traffic lane, a module for producing a correction instruction according to the input variable, and an assistance module capable of implementing a driving assistance action according to the correction instruction. The input variable includes a lateral position of the vehicle in the traffic lane and a lateral deflection speed of the vehicle.

6 Claims, 4 Drawing Sheets

(52) U.S. Cl.
CPC ..... *B60W 2520/06* (2013.01); *B60W 2520/12* (2013.01); *B60W 2710/20* (2013.01)

(56) References Cited

U.S. PATENT DOCUMENTS

| | | | | |
|---|---|---|---|---|
| 2014/0257640 | A1* | 9/2014 | Mitsumoto | B60W 40/101 |
| | | | | 701/41 |
| 2015/0210318 | A1* | 7/2015 | Takeda | B62D 6/008 |
| | | | | 701/41 |
| 2015/0274163 | A1* | 10/2015 | Terazawa | B60W 10/20 |
| | | | | 701/41 |
| 2015/0274206 | A1 | 10/2015 | Takeda | |
| 2016/0052547 | A1* | 2/2016 | Kashiwai | B60W 40/076 |
| | | | | 701/41 |
| 2016/0129933 | A1 | 5/2016 | Akatsuka et al. | |
| 2016/0185388 | A1* | 6/2016 | Sim | B60W 10/20 |
| | | | | 701/41 |
| 2017/0282972 | A1 | 10/2017 | Moretti | |
| 2017/0313304 | A1* | 11/2017 | Shiraishi | B60W 30/04 |
| 2018/0170377 | A1* | 6/2018 | Tatsukawa | B62D 15/025 |
| 2018/0201307 | A1* | 7/2018 | Kudo | B62D 1/28 |

FOREIGN PATENT DOCUMENTS

| | | |
|---|---|---|
| FR | 3 026 708 A1 | 4/2016 |
| WO | WO 2013/107978 A1 | 7/2013 |
| WO | WO 2017/037374 A1 | 3/2017 |

* cited by examiner

ASSISTANCE DEVICE FOR DRIVING A MOTOR VEHICLE IN A TRAFFIC LANE

BACKGROUND

The present invention relates to the field of driving assistance devices for a motor vehicle in a traffic lane, and more particularly devices to keep the vehicle in its traffic lane or to center the vehicle in its traffic lane.

Nowadays, driving assistance devices for a motor vehicle in a traffic lane are known in the prior art. For example, devices for keeping a motor vehicle in a traffic lane are commonly known as "Lane Keeping Assist" or by the corresponding abbreviation "LKA". Likewise, devices for centering a motor vehicle in its traffic lane are commonly known as "Lane Centering Assist" or by the corresponding abbreviation "LCA".

Such systems are generally integrated in a vehicle computer and are in data communication with a camera and a network controller. The network controller is a conventional computer incorporated in a vehicle, and is more commonly known as "Controller Area Network" or by the corresponding abbreviation "CAN". Thus integrated, a driving assistance device is capable of correcting a lateral position of the vehicle with respect to its traffic lane.

Although such systems are generally considered to be advantageous, they are however not completely satisfactory. Indeed, a number of parameters acting on the heading hold function performed by the vehicle can cause this dissymmetry of correction actions during changes of state of the road. Examples of such parameters can be all the links of the vehicle with the ground, the geometry of these links, rubber joints, shock absorbers, tires, tire pressures, vertical deformations of the carriageway, road camber, weather conditions such as in particular contact moisture or crosswinds, and the surface. This list is of course not exhaustive. Now systems of the prior art calculate a control law based on these parameters which can change as a function of time, while considering them as fixed. As such, the control law obtained does not take into account the variations of the internal and external parameters of the system. It follows that the correction generated by the assistance device is often ineffective.

To overcome these drawbacks, assistance devices of the prior art propose estimating all the disruptive parameters, in order to compensate for them later. The estimates can be implemented by means of observers. However, these estimates considerably increase the complexity of the device.

BRIEF SUMMARY

In view of the above, the invention aims to provide a device for assisting driving in a traffic lane enabling control of the trajectory of a motor vehicle suitable for most of the conditions of operation of this vehicle while limiting the complexity of the device.

To this end, there is proposed a driving assistance device for a motor vehicle in a traffic lane, comprising a module for determining at least one input variable chosen from among variables relating to the vehicle and variables relating to the traffic lane, a module for generating a correction setting as a function of said input variable, and an assistance module suitable for implementing a driving assistance action as a function of the correction setting.

According to a general characteristic of this assistance device, said input variable comprises a lateral position of the vehicle in the traffic lane and a lateral deviation speed of the vehicle.

Due to the use of such input variables, the driving assistance implemented by this device approaches the perception and reaction of a human driver. To observe the deviation of his/her vehicle, a driver makes use of his/her peripheral vision which is hazy but fast, more than that of his/her foveal vision which is sharp but slow. In the peripheral field of vision, the driver perceives on the one hand the position of his/her vehicle in its lane, and on the other hand the lateral deviation speed of the vehicle. Thus, the assistance device according to the invention can implement driving assistance in a manner that is close to that of a human being in any operating situation, so as to best manage the most complex situations.

Preferably, said input variable additionally comprises at least one variable chosen from among a longitudinal speed of the vehicle, a width of the traffic lane and a width of the vehicle.

As will be explained later, such input variables can provide for refining the estimate of other input variables and/or even more precisely adapt the correction action.

According to one embodiment, the generation module comprises a mapping containing values of correction settings as a function of the lateral position of the vehicle in the traffic lane and of the lateral deviation speed of the vehicle.

Due to the use of such a mapping, the correction action is adapted in a simple manner, and thus the driving assistance implemented by the device according to the invention, taking account of the input variables.

According to another embodiment, the determination module comprises a first calculation means for calculating a time before the crossing of the traffic lane boundary and the generation module comprises a second calculation means suitable for calculating the correction setting as a function of the time before the calculated crossing time.

The calculation of such a quantity is an alternative to the mapping to adapt the correction action. This alternative requires more computation resources, but the memory associated with the assistance device will be able to be smaller. Moreover, as will be explained later, the calculation of this intermediate quantity provides for preventing discontinuities of the correction setting.

Advantageously, in any one of the abovementioned embodiments, the generation module also takes account of a longitudinal speed of the vehicle.

In an advantageous embodiment, the assistance module comprises a corrector and a means for adjusting at least one parameter of the corrector, the setting signal generated by the generation module being a set of parameters of the corrector.

Such an arrangement provides a corrector with adaptive control, so as to enable the adaptation of the correction action by means of a single corrector. Thus, the complexity of the assistance device is further limited.

According to another embodiment, the assistance module comprises at least two correctors and a switch, the switch being suitable for activating one of said correctors as a function of the generated correction setting.

With such a configuration, the switch allows different correctors to be chosen. This alternative slightly complicates the structure of the assistance device according to the invention, but provides for limiting the number of mappings incorporated therein and provides for limiting the calculation time.

Advantageously, the determination module comprises a camera suitable for detecting at least one measured variable chosen from among a traffic lane boundary position and a heading followed by the vehicle, and a computer capable of determining, from said measured variable, at least one variable chosen from among a width of the traffic lane and a center of the traffic lane.

Preferably, the generation module comprises a damping means intended to avoid an abrupt variation of the correction setting, said damping means being capable of filtering the correction setting and/or of producing a ramp between two successive values of the correction setting.

With such a damping means, the appearance of oscillations of the steering wheel, that are perceptible by the driver, are avoided.

Advantageously, the generation module comprises a hysteresis trigger.

Such a trigger can replace or complete the damping means. As will be explained later, the hysteresis trigger also provides for avoiding the appearance of oscillations of the steering wheel that are perceptible by the driver.

According to another aspect, there is proposed a driving assistance method for a motor vehicle in a traffic lane, in which a position of a boundary of the traffic lane and a heading followed by the vehicle are measured, at least one input variable chosen from among variables relating to the vehicle and variables relating to the traffic lane is determined, said input variable comprising a lateral position of the vehicle in the traffic lane and a lateral deviation speed of the vehicle, a correction setting is generated as a function of said input variable, and a driving assistance action is implemented as a function of the correction setting.

BRIEF DESCRIPTION OF THE DRAWINGS

Other aims, features and advantages of the invention will emerge from reading the following description, given purely by way of nonlimiting example, and with reference to the accompanying drawings in which.

DETAILED DESCRIPTION

Figure 1:
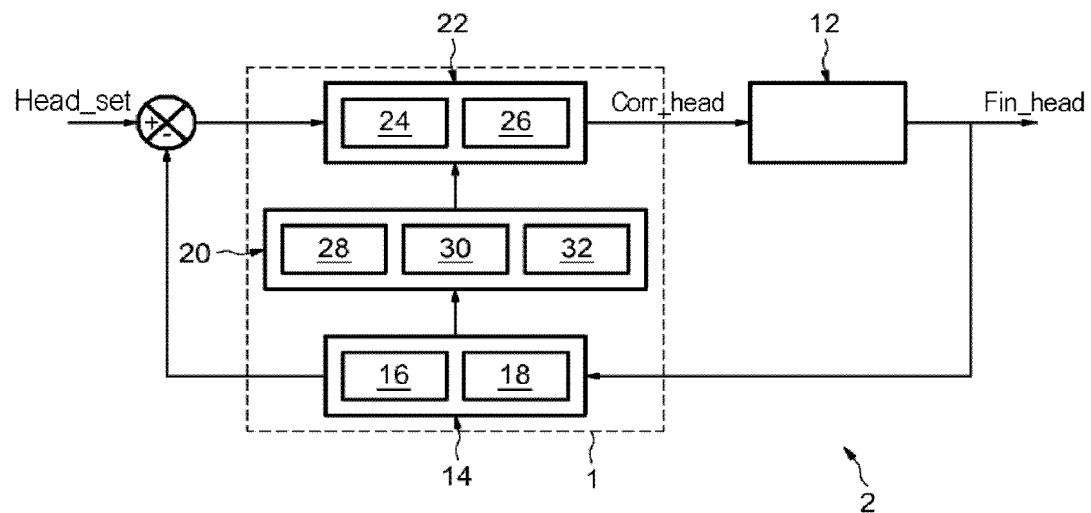
FIG. 1 is a schematic representation of an assistance device according to a first embodiment of the invention.
Figure 3:
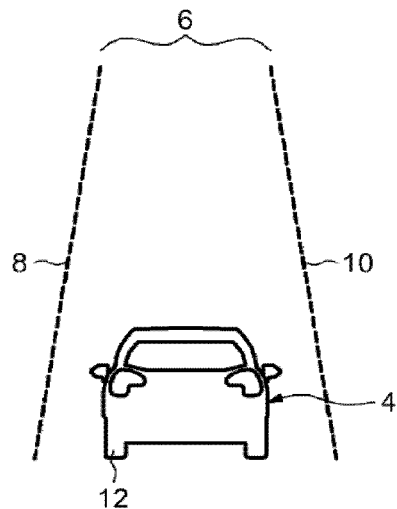
FIG. 3 is a diagram illustrating the operation of the device of FIG. 1, FIG. 4 schematically represents an assistance device according to a second embodiment of the invention.

With reference to FIGS. 1 and 3, a device for assisting driving in a traffic lane 1 according to a first embodiment of the invention is intended to be incorporated in a motor vehicle 4 moving in a traffic lane 6. The assistance device 1 is schematically represented in FIG. 1 in a block diagram 2 illustrating the position control of the vehicle 4 in the traffic lane 6.

The traffic lane 6 is laterally delimited by two boundaries 8 and 10. In the example illustrated, the boundaries 8 and 10 are broken white lines produced on the carriageway. However, consideration of other examples of traffic lane boundaries, for example continuous lines, roadsides or even reflective markers such as Bott dots, clearly does not depart from the scope of the invention. The vehicle 4 comprises a steering system 12. Alternatively, the vehicle includes several steering systems as in the case of a vehicle equipped with four-wheel steering.

With reference to FIG. 1, the steering system 12 is represented in the block diagram 2. The system 12 is capable of transforming a corrected heading Corr_head into a final heading Fin_head of the vehicle 4 on the traffic lane 6.

The assistance device 1 includes a determination module 14. In the embodiment of FIG. 1, the determination module 14 comprises a camera 16 and a computer 18 in data connection with the camera 16. The camera 16 and the computer 18 are in data communication with a network controller (not represented) of the vehicle 4.

The camera 16 is capable of detecting variables relating to the vehicle 4 and to the traffic lane 6. In this particular case, the camera 16 detects the position, relative to the vehicle 4, of the boundaries 8 and 10. The camera 16 detects the heading followed by the vehicle 4 with respect to the direction of the boundaries 8 and 10.

The computer 18 is capable of calculating the width $L_6$ of the traffic lane 6 from the positions of the boundaries 8 and 10, which positions are detected by the camera 16. The computer 18 is capable of detecting a position of the center (not represented) of the traffic lane 6 from the positions of the boundaries 8 and 10, which positions are detected by the camera 16 and from the width $L_6$.

The computer 18 is capable calculating a lateral position $y_{4/6}$ of the vehicle 4 in the traffic lane 6. To this end, the computer 18 takes account of the positions of the boundaries 8 and 10 detected by the camera 16, the width $L_6$ and the center of the traffic lane 6. The position $y_{4/6}$ delivered by the computer 18 will be negative if the vehicle 4 is located between the boundary 8 and the center of the lane 6, and positive if the vehicle 4 is located between the boundary 10 and the center of the lane 6.

The computer 18 is furthermore capable of calculating a lateral deviation speed $V_{4/6}$ of the vehicle 4. To this end, the computer 18 takes account of the heading measured by the camera 16 and a longitudinal speed $V_{long}$ of the vehicle. The computer 18 can also deliver the lateral position $y_{4/6}$ of the vehicle to obtain the lateral speed $V_{4/6}$. Just as for the position $y_{4/6}$, the lateral speed $V_{4/6}$ delivered by the computer 18 is negative if the vehicle veers toward the boundary 8 and positive if the vehicle 4 veers toward the boundary 10.

The speed $V_{long}$ is determined by means specific to the vehicle 4 and received by the computer 18 through the network controller of the vehicle. Moreover, the computer 18 receives through the network controller the width $L_{VEH}$ of the vehicle.

The assistance device 1 additionally includes a generation module 20. The generation module 20 is in data communication with the determination module 14. The function of the generation module 20 is to generate a correction setting taking account of input variables determined by the determination module 14. The correction setting will enable the correction action to be adapted to the operating conditions of the motor vehicle 4 in the traffic lane 6. The structure of the generation module 20 will be explained in more detail later.

The assistance device 1 additionally includes an assistance module 22. The assistance module 22 is in data connection with the generation module 20. The function of the assistance module 22 is to implement a driving assistance action taking account of the correction setting.

In the embodiment of FIG. 1, the function of the assistance module 22 is to correct a difference with respect to the heading setting Head_set as represented by the block diagram 2. The assistance device 1 therefore intervenes automatically on the steering system 12 of the vehicle 4. However, consideration of an assistance module providing a driving assistance action of another kind, for example alerting the driver by displaying a warning on the dashboard, does not depart from the scope of the invention. Provision can just as well be made for the assistance module to comprise both a means for warning the driver and a means for correcting the direction followed by the vehicle 4.

The assistance module 22 comprises a corrector 24. In the example embodiment illustrated in FIG. 1, the corrector 24 is a Proportional-Integral-Derivative (PID) corrector. Such a corrector has been intentionally chosen to simplify the description of the invention. However, another type of corrector can of course be considered without departing from the scope of the invention, in particular a more advanced corrector.

In this embodiment, the three parameters $k_i$, $k_p$ and $k_d$ of the PID corrector 24 can be modified. The assistance module 22 comprises an adjustment means 26 in data communication with the corrector 24. More particularly, the correction module 26 is capable of modifying the settings of the parameters $k_i$, $k_p$ and $k_d$. To modify these parameters, the adjustment means 26 takes account of the correction signal delivered by the generation module 20.

Figure 2:
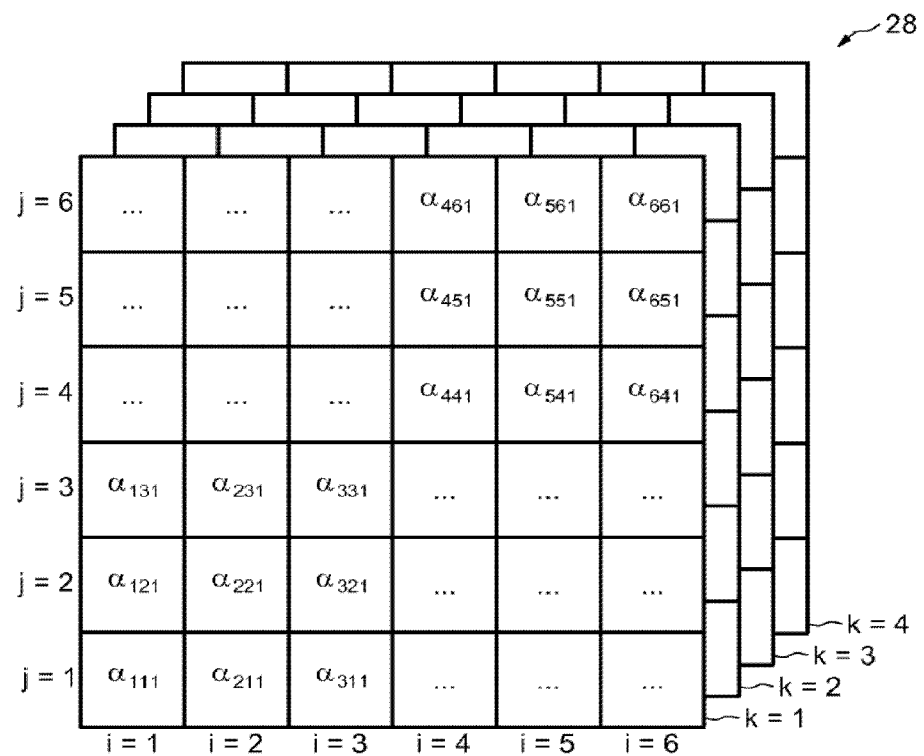
FIG. 2 illustrates a mapping incorporated in the device of FIG. 1.

With reference to FIGS. 1 and 2, the generation module 20 comprises a mapping 28. The mapping 28 is represented in detail in FIG. 2.

In this embodiment, the mapping 28 contains values of correction settings as a function of the position $y_{4/6}$, speed $V_{4/6}$ and longitudinal speed $V_{long}$. The correction setting values are denoted in the form $\alpha_{ijk}$, where, with reference to FIG. 2:

i denotes the position, from left to right, of the column in which $y_{4/6}$ must be placed, j indicates the position, from bottom to top, of the row in which $V_{4/6}$ must be placed, and k indicates the plane in which the longitudinal speed $V_{long}$ of the vehicle 4 must be placed.

More specifically, in the example illustrated, the values i in the columns of the mapping 28 are allocated in the following way:

$$\begin{bmatrix} -L_6 \leq y_{4/6} \leq -\frac{2}{3} \cdot L_6 \Rightarrow i = 1 \\ -\frac{2}{3} \cdot L_6 < y_{4/6} \leq -\frac{1}{6} \cdot L_6 \Rightarrow i = 2 \\ -\frac{1}{6} \cdot L_6 < y_{4/6} \leq 0 \Rightarrow i = 3 \\ 0 < y_{4/6} \leq \frac{1}{6} \cdot L_6 \Rightarrow i = 4 \\ \frac{1}{6} \cdot L_6 < y_{4/6} \leq \frac{2}{3} \cdot L_6 \Rightarrow i = 5 \\ \frac{2}{3} \cdot L_6 < y_{4/6} \leq L_6 \Rightarrow i = 6 \end{bmatrix}$$

Similarly, the values j in the rows of the mapping 28 are allocated in the following way:

$$\begin{bmatrix} -\infty < V_{4/6} \leq -V_2 \Rightarrow j = 1 \\ -V_2 < V_{4/6} \leq -V_1 \Rightarrow j = 2 \\ -V_1 < V_{4/6} \leq 0 \Rightarrow j = 3 \\ 0 < V_{4/6} \leq V_1 \Rightarrow j = 4 \\ V_1 < V_{4/6} \leq V_2 \Rightarrow j = 5 \\ V_2 < y_{4/6} < +\infty \Rightarrow j = 6 \end{bmatrix}$$

where $V_1$, $V_2$ denote predefined thresholds.

The values k in the planes of the mapping 28 are allocated in the following way:

$$\begin{bmatrix} 0 \text{ km/h} < V_{long} \leq 40 \text{ km/h} \Rightarrow k = 1 \\ 40 \text{ km/h} < V_{long} \leq 80 \text{ km/h} \Rightarrow k = 2 \\ 80 \text{ km/h} < V_{long} \leq 120 \text{ km/h} \Rightarrow k = 3 \\ 120 \text{ km/h} < V_{long} \leq 160 \text{ km/h} \Rightarrow k = 4 \end{bmatrix}$$

In the embodiment of FIGS. 1 and 2, the correction setting $\alpha_{ijk}$ corresponds to a triplet ($k_i$, $k_p$, $k_d$). The values $\alpha_{ijk}$ contained in the mapping 28 are established so as to make the correction action fast, of high magnitude and stabilized if:

the index i is different from 3, 4 and close to 1 or 6, and/or
the index j is different from 3, 4 and close to 1 or 6, and/or
the index k is equal to 3 or 4.

Conversely, the correction will be non-existent or small if:
the index i is equal to 3 or 4, and/or
the index j is equal to 3 or 4, and/or
the index k is equal to 1 or 2.

By characterizing the deviation by the speed $V_{4/6}$, the position $y_{4/6}$ and the speed $V_{long}$, the mapping 28 adapts the correction action just as a human driver would when attentive to the situation. There follows a global adaptation of the correction of the heading which provides for taking into account all the types of deviation. In particular, this correction takes account of variabilities of the links with the ground and of the road, of various driving conditions, and of crosswinds. The generation means thus designed therefore provides for avoiding the creation of observers for each of the variables, and therefore avoids increasing the complexity of the device 1.

As illustrated in FIG. 2, boxes corresponding to values of i between 4 and 6 and j between 1 and 3, as well as the boxes corresponding to values of i between 1 and 3 and j between 4 and 6, are deliberately empty. Specifically, under those conditions, the vehicle is in the process of repositioning toward the center of the traffic lane 6. Consequently, the heading setting Head_set is not corrected, or is slightly corrected.

In the example illustrated, the positions $y_{4/6}$ and the speeds $V_{4/6}$ are listed in three negative ranges and three positive ranges. Consideration of a different number of ranges does not however depart from the scope of the invention. Likewise, consideration of a different number of ranges to list the speeds $V_{long}$ does not depart from the scope of the invention. More particularly, the number of ranges can be chosen as a function of an available memory allocated to the mapping 28. Delimiting the ranges by different threshold values also does not depart from the scope of the invention.

Again with reference to FIG. 1, the generation means 20 includes a damping means 30. The damping means 30 is in data connection with the mapping 28. When the correction setting changes from a value $\alpha_{ijk}$ to a value $\alpha_{i'j'k'}$, where (i,j,k)≠(i',j',k'), the damping means 30 ensure that the correction setting delivered by the mapping 28 follows a ramp between the values $\alpha_{ijk}$ and $\alpha_{i'j'k'}$. By virtue of such a damping means 30, the appearance of oscillations that are perceptible by the driver are avoided. Alternatively, the damping means 30 can be equipped with hardware and software to filter the correction setting during the transition between the values $\alpha_{ijk}$ and $\alpha_{i'j'k'}$. According to another alternative, the mapping 28 can be designed to be able to drive the transitions from one setting value to another setting value.

Moreover, the generation module 20 comprises a hysteresis trigger 32. The trigger 32 applies a hysteresis to the changes of state of the values i, j and k. Thus, multiple and continual changes of the correction setting are avoided when the position $y_{4/6}$, the speed $V_{4/6}$ and/or the longitudinal speed $V_{long}$ are close to the threshold values of the mapping 28. Thus, the appearance of oscillations that can be perceived by the driver under these operating conditions of the vehicle 4 are avoided.

In this embodiment, the hysteresis trigger 32 is supplied in addition to the damping means 30 in order that the driver does not at all perceive oscillations of the steering of the vehicle. However, the generation means 20 can comprise only one or other of the components 30 and 32 without departing from the scope of the invention.

Figure 4:
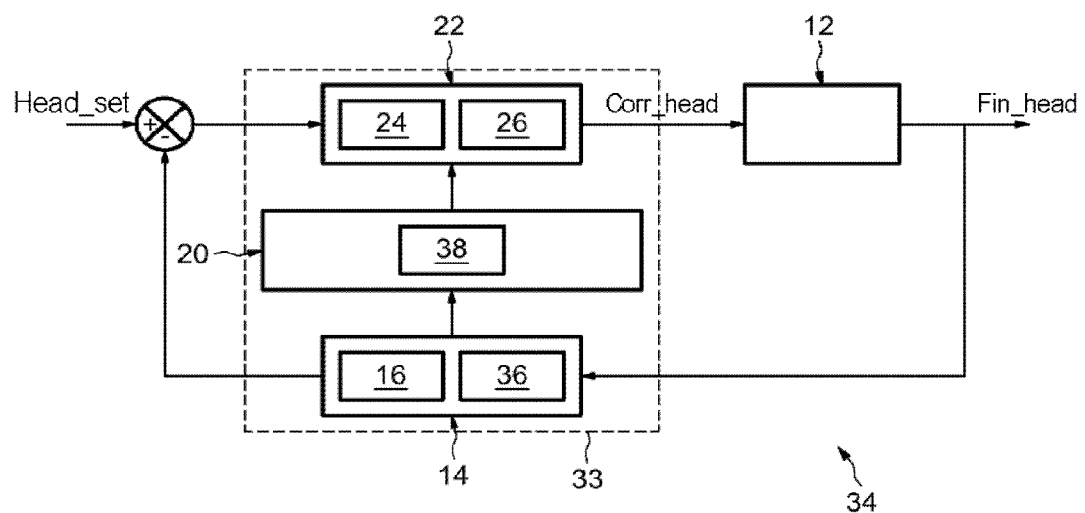

With reference to FIG. 4, there is schematically represented a device for assisting driving in a traffic lane 33 according to a second embodiment. The assistance device 33 is schematically represented in a block diagram 34 similar to the block diagram 2 in FIG. 1. Identical items bear the same references.

With reference to FIG. 4, the determination module 14 comprises a computer 36 replacing the computer 18 of the first embodiment. Like the computer 18, the computer 36 is capable of calculating the lateral position $y_{4/6}$, the lateral deviation speed $V_{4/6}$, the width $L_6$ and the center of the traffic lane 6. Moreover, the computer 36 is capable of calculating a time $T_{AVF}$ before the traffic lane boundary is crossed. The time $T_{AVF}$ corresponds to the estimated duration for the vehicle 4, continuing along its route without heading correction, to cross one of the boundaries 8 and 10. To perform this calculation, the computer 36 takes account of the position $y_{4/6}$, the speed $V_{4/6}$ and the width $L_{VEH}$.

In this embodiment, the generation means 20 includes a mapping 38. The mapping 38 transmits a correction setting to the address of the assistance module 22, on which setting the correction action will depend.

Figure 5:
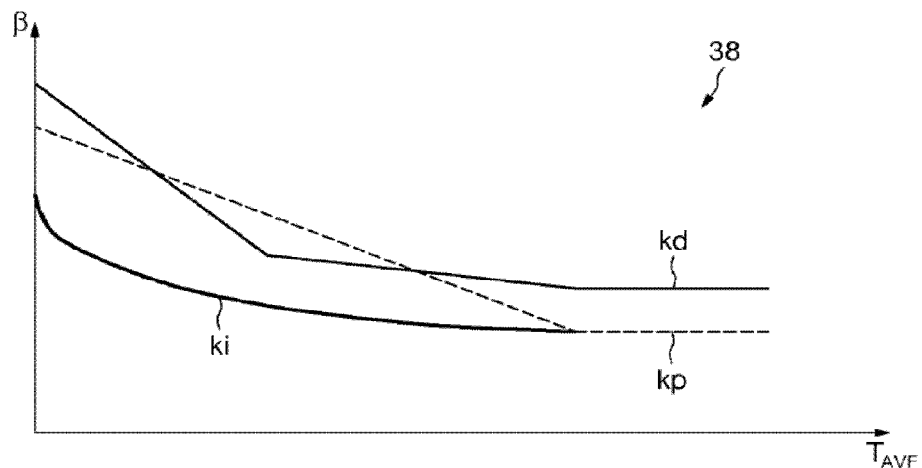
FIG. 5 illustrates a mapping incorporated in the device of FIG. 4.

With reference to FIG. 5, the mapping 38 contains values of correction settings β corresponding, as in the first embodiment, to triplets ($k_i$, $k_p$, $k_d$). The mapping 38 delivers a correction setting value β as a function of the time $T_{AVF}$.

Thus, as in the first embodiment, the mapping 38 delivers the correction setting as a function of an input variable, in this particular case $T_{AVF}$. However, the mapping 38 may be less complex than the mapping 28. Another advantage of calculating the time $T_{AVF}$ and of generating the correction setting as a function of $T_{AVF}$ is that it is easier to prevent correction setting discontinuities. As a consequence of this advantage, the generation module 20 of the device 32 does not comprise the damping means 30 nor the hysteresis trigger 32 of the first embodiment. As in the first embodiment, the mapping 38 can also take account of the longitudinal speed $V_{long}$ of the vehicle.

Figure 6:
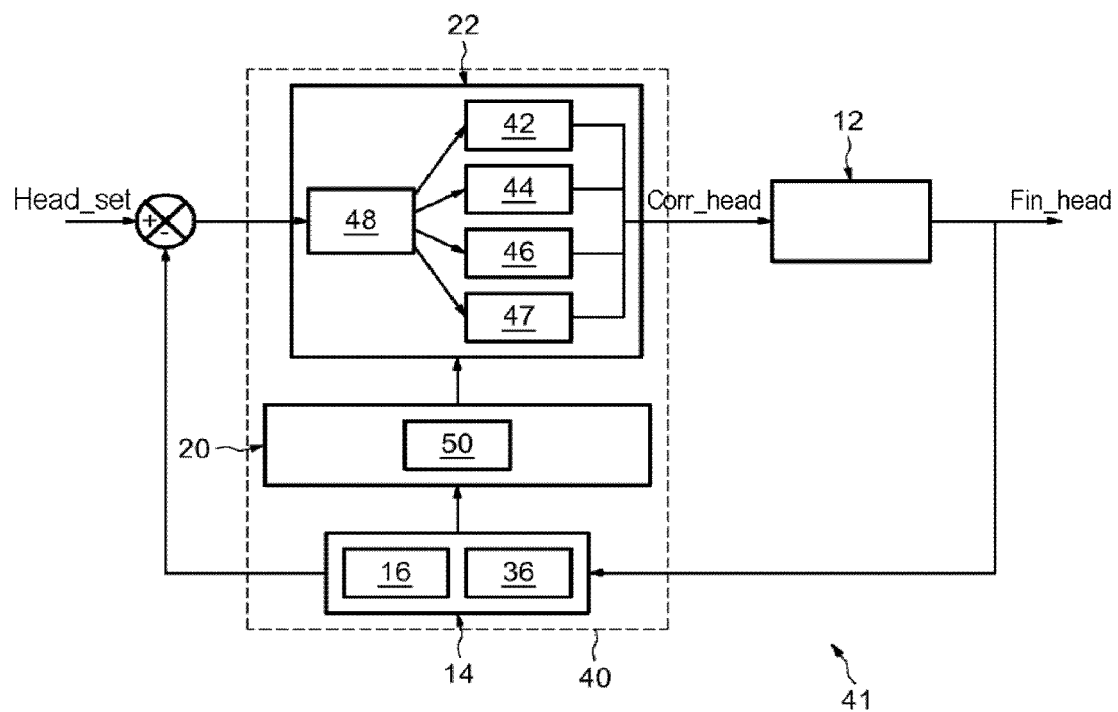
FIG. 6 is a schematic representation of an assistance device according to a third embodiment of the invention.

With reference to FIG. 6, there is schematically represented a device for assisting driving in a traffic lane 40 according to a third embodiment of the invention. The assistance device 40 is schematically represented in a block diagram 41 similar to the block diagram 34 in FIG. 4. Identical items bear the same references.

In this embodiment, the assistance module 22 includes a first corrector 42, a second corrector 44, a third corrector 46 and a fourth corrector 47. The correctors 42, 44, 46 and 47 can be proportional-integral-derivative (PID) correctors or any other types of correctors, for example more advanced ones. The higher the reference number of the corrector 42, 44, 46, 47, the more the corrector brings about a fast, extensive and stable correction action. Thus, the corrector 42 brings about a comfortable correction action, which is also the slowest, smallest and least stable. The corrector 47 brings about a correction action which is faster, more extensive and more stable.

The assistance module 22 additionally includes a switch 48. The purpose of the switch 48 is to activate one of the correctors 42, 44, 46 and 47 at the same time as it deactivates the others. Thus, when the switch 48 selects the corrector 42, only the corrector 42 implements the Head_set correction action. In order to select which of the correctors 42, 44, 46 and 47 must be activated, the switch 48 is in data connection with a mapping 50 of the generation module 20.

Figure 7:
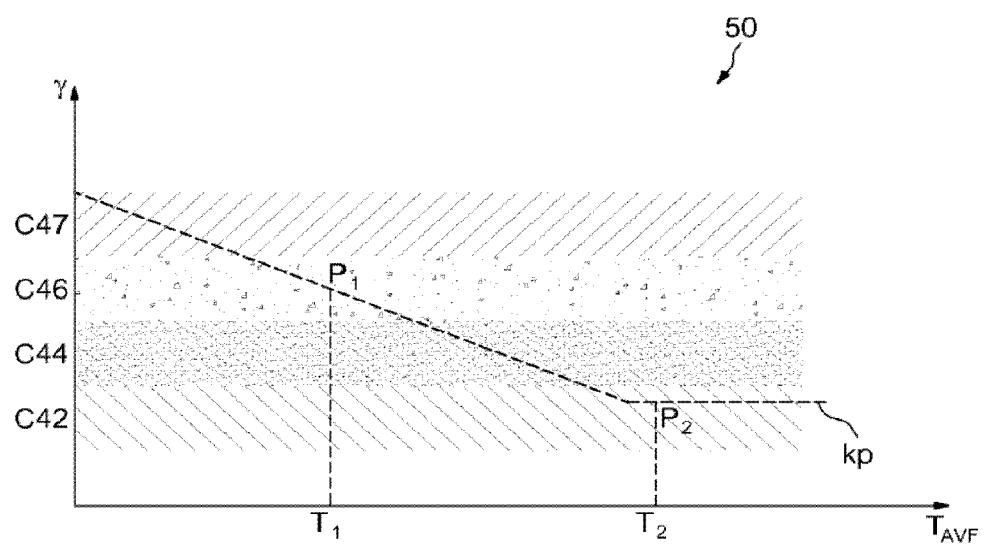
FIG. 7 illustrates a mapping incorporated in the device of FIG. 6.

With reference to FIG. 7, the mapping 50 contains values C42, C44, C46, C47 of activation setting γ of the correctors 42, 44, 46, 47 as a function of the time $T_{AVF}$. The value γ delivered by the mapping 50 corresponds to the area of the ordinate of the point of the curve kp of abscissa $T_{AVF}$. Thus, if $T_{AVF}$=T1 (see FIG. 7), the ordinate of the point of the curve kp of abscissa $T_{AVF}$ is located in the area of the corrector 46, therefore γ=C46. If $T_{AVF}$=T2, the ordinate of the point of the curve kp of abscissa $T_{AVF}$ is located in the area of the corrector 42, therefore γ=C42. When the mapping addresses the setting C42 at the switch 48, the latter activates the corrector 42. The same clearly applies for the settings C44, C46 and C47 and the correctors 44, 46 and 47 respectively. As in the first two embodiments, the mapping 38 can also take account of the longitudinal speed $V_{long}$ of the vehicle.

Thus, when the time $T_{AVF}$ is a low value, the corrector 47 will be chosen given the danger of leaving the road. Conversely, if the time $T_{AVF}$ is a high value, the corrector 47 is chosen to be activated to favor the comfort of the occupants of the vehicle 4.

Thus, in the third embodiment, the assistance device 40 calculates the time $T_{AVF}$, then adapts the correction action as a function of the time $T_{AVF}$. The determination module 14 is therefore identical to the module 14 in the second embodiment. However, modifying the determination module 14 and the generation module 20 such that the correction setting is generated directly as a function of the position $y_{4/6}$, the speed $V_{4/6}$ and the speed $V_{long}$ does not depart from the scope of the invention. In that case, the mapping of the generation module is similar to the mapping 28 of the first embodiment, except that the values of settings contained in the mapping are not triplets ($k_i$, $k_p$, $k_d$) but activation settings of the correctors C42, C44, C46 and C47.

In any one of the embodiments which have been described, there can additionally be provided a means (not represented) for inhibiting the correction action. This inhibition means can be activated in the event of a loss of confidence in the conditions of activation of the correction action, immediate danger, lack of stability, or lack of consistency of the assistance device.

In view of the above, the three embodiments of the invention enable an adaptation of the correction action without considerably increasing the complexity of the system. In particular, the cost of implementation of the invention is particularly low since it is limited mainly in perfecting the mappings.

In each of the three embodiments, the mapping is constructed so as to enable an identification of a level of criticality of a deviation of the motor vehicle with respect to the traffic lane, so as to modify the correction action as a function of this level of criticality. As such, the correction action is adapted according to a behavior that is comparable to the behavior of a human driver, so as to improve the correction.

The invention claimed is:

1. A driving assistance device for a motor vehicle in a traffic lane, comprising:
 a determination module including a camera and a computer in data connection with the camera, and the determination module utilizes the camera and computer to determine a position of the vehicle with respect to the traffic lane, a lateral deviation speed of the vehicle, and a longitudinal speed of the vehicle,
 a generation module including a mapping of values of correction settings, and the generation module selects a correction setting from the correction settings of the mapping as a function of only the vehicle position, the lateral deviation speed, and the longitudinal speed determined by the determining module, and
 an assistance module that adjusts an operation of a steering system of the vehicle to implement a driving assistance action as a function of the correction setting selected by the generation module, wherein, as soon as the vehicle has a lateral speed and a lateral positioning indicating that the vehicle is repositioning toward a center of the traffic lane, the correction setting is set to zero.

2. The device) as claimed in claim 1, in which the assistance module comprises a corrector and a means for adjusting at least one parameter of the corrector, a setting signal generated by the generation module being a set of parameters of the corrector.

3. The device as claimed in claim 1, in which the a camera is configured to detect at least one measured variable chosen from among a position of a boundary of the traffic lane and a heading followed by the vehicle, and the computer is configured to detect, from said measured variable, at least one variable chosen from among a width of the traffic lane and a center of the traffic lane.

4. The device as claimed in claim 1, in which the generation module comprises a damping means for avoiding an abrupt variation of the correction setting, said damping means filtering the correction setting and/or producing a ramp between two successive values of the correction setting.

5. The device as claimed in claim 1, in which the generation module comprises a hysteresis trigger.

6. A driving assistance method for a motor vehicle in a traffic lane, comprising:
 measuring a boundary position of the traffic lane and a heading followed by the vehicle,
 determining, via a camera and a computer in data connection with the camera, a position of the vehicle with respect to the traffic lane, a lateral deviation speed of the vehicle, and a longitudinal speed of the vehicle,
 selecting a correction setting from a mapping of values of correction settings as a function of only the vehicle position, the lateral deviation speed, and the longitudinal speed determined by the determining, and
 adjusting an operation of a steering system of the vehicle to implement a driving assistance action as a function of the correction setting selected by the selecting, wherein, as soon as the vehicle has a lateral speed and a lateral positioning indicating that the vehicle is repositioning toward a center of the traffic lane, the correction setting is set to zero.

* * * * *